July 7, 1925.
V. E. FISHER
1,545,136
BRACKET FOR PLOW FENDERS
Filed Feb. 27, 1925
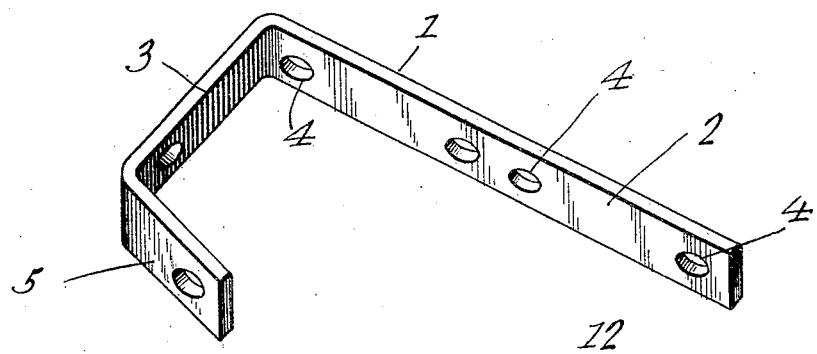
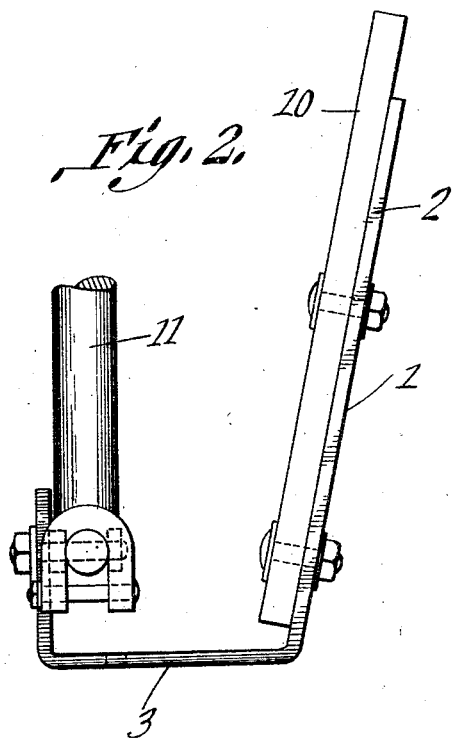
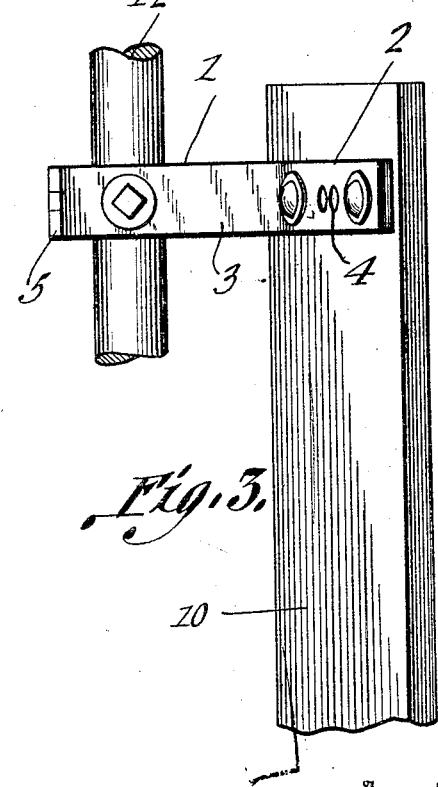
Inventor
V. E. Fisher
By C.A. Snow & Co.
Attorneys Patented July 7, 1925.

1,545,136

UNITED STATES PATENT OFFICE.

VAN E. FISHER, OF BIG SPRING, NEBRASKA.

BRACKET FOR PLOW FENDERS.

Application filed February 27, 1925. Serial No. 12,095.

*To all whom it may concern:*

Be it known that I, VAN E. FISHER, a citizen of the United States, residing at Big Spring, in the county of Deuel and State of Nebraska, have invented a new and useful Bracket for Plow Fenders, of which the following is a specification.

This invention relates to plant fenders for cultivators of the type shown in my Patent No. 1,525,575 issued February 10, 1925.

The object of the invention is to provide a fender of this character which may be easily adjusted to permit the shovel to be used in close proximity to small plants without covering them with earth.

Another object is to provide simple and efficient means for securing the fender at any desired angle for throwing the dirt in or out.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings:—

Figure 1 represents a perspective view of the bracket or brace employed to affect the variation in the angle of the fender;

Fig. 2 is a plan view thereof showing the bracket attached; and

Fig. 3 is a front elevation showing the fender applied by means of this bracket.

The bracket 1 constituting this invention and which is used for connecting the fender 10 to a shovel shank 11 is preferably made of strap iron and is substantially U-shaped in form, with one arm 2 made longer than the other, said arm being extended at an oblique angle, that is being inclined outwardly from the cross bar 3 and to which the fender 10 is designed to be bolted, said arm being provided with a plurality of apertures 4 for this purpose, the oblique arrangement of the arm 2 provides for the angular positioning of the fender 10 as is shown clearly in Figs. 2 and 3 without necessitating the use of any wedge-shaped or other washers such as are found necessary in the patent above referred to.

The short arm 5 of the bracket 1 and its cross bar 3 are also apertured for the attachment of the bracket either to a plow shovel shank 11 by means of the short arm 5 as shown in Fig. 2 or to the shank 12 by means of the cross bar 3 as shown in Fig. 3.

It will be obvious that the plate 10 may be adjusted toward or away from the cultivator shovel carried by the shank 11 owing to the plurality of apertures formed in the bracket and yet the bracket will not be weakened.

The fender 10 is here shown in the form of a plate solid throughout but obviously it may be of any other desired construction. The bracket 1 which is used for mounting this plate 10 obviously may be very cheaply constructed and yet will be strong and efficient.

I claim:—

1. A plant fender for cultivators comprising a shield, a substantially U-shaped attaching bracket, with one leg longer than the other and connected with said shield to extend laterally therefrom, the cross bar of said brackets being apertured to adjustably receive a fastening bolt, and means for connecting the short arm of said bracket with a cultivator shovel, said long arm being disposed at an oblique angle to the cross bar.

2. A bracket for attaching a plant fender to a cultivator shovel comprising a substantially U-shaped member having one arm longer than the other, said long arm extending outwardly at an oblique angle to the cross bar of said bracket, and said arms and cross bar being apertured to receive attaching bolts.

In testimony that I claim the foregoing as my own, I have hereto affixed my signature in the presence of two witnesses.

VAN E. FISHER.

Witnesses:
OLIVE FISHER,
IRMA SKRIVAN.